United States Patent
Des Jardins

[15] 3,673,895
[45] July 4, 1972

[54] SELF-EJECTING CHUCK KEY
[72] Inventor: James Des Jardins, Chicago, Ill.
[73] Assignee: Emerson Electric Co., St. Louis, Mo.
[22] Filed: Sept. 16, 1970
[21] Appl. No.: 73,046

[52] U.S. Cl. .................................................... 81/90 A
[51] Int. Cl. ..................................................... B25b 13/44
[58] Field of Search .................. 81/90 R, 90 A; 70/414; 279/1 K

[56] References Cited

UNITED STATES PATENTS 2,660,081  11/1953  Dossie ................................ 279/1 K
2,488,240  11/1949  Rumsey ................................ 70/414

FOREIGN PATENTS OR APPLICATIONS 71,145  6/1950  Denmark ................................ 70/414

Primary Examiner—Travis S. McGehee
Assistant Examiner—Roscoe V. Parker, Jr.
Attorney—J. D. Douglass

[57] ABSTRACT

A chuck key having a pilot for insertion in the pilot hole in a chuck body, with a pinion gear for engaging the chuck gear and a T handle has a helical spring portion wrapped around the shank and an extension of the spring extends through a kerf between the teeth of the pinion with a part extending alongside the pilot. When the key is engaged with the chuck the extension of the spring is pushed back into the kerf compressing the spring and when released the spring pushes the key out of engagement with the chuck.

6 Claims, 1 Drawing Figure

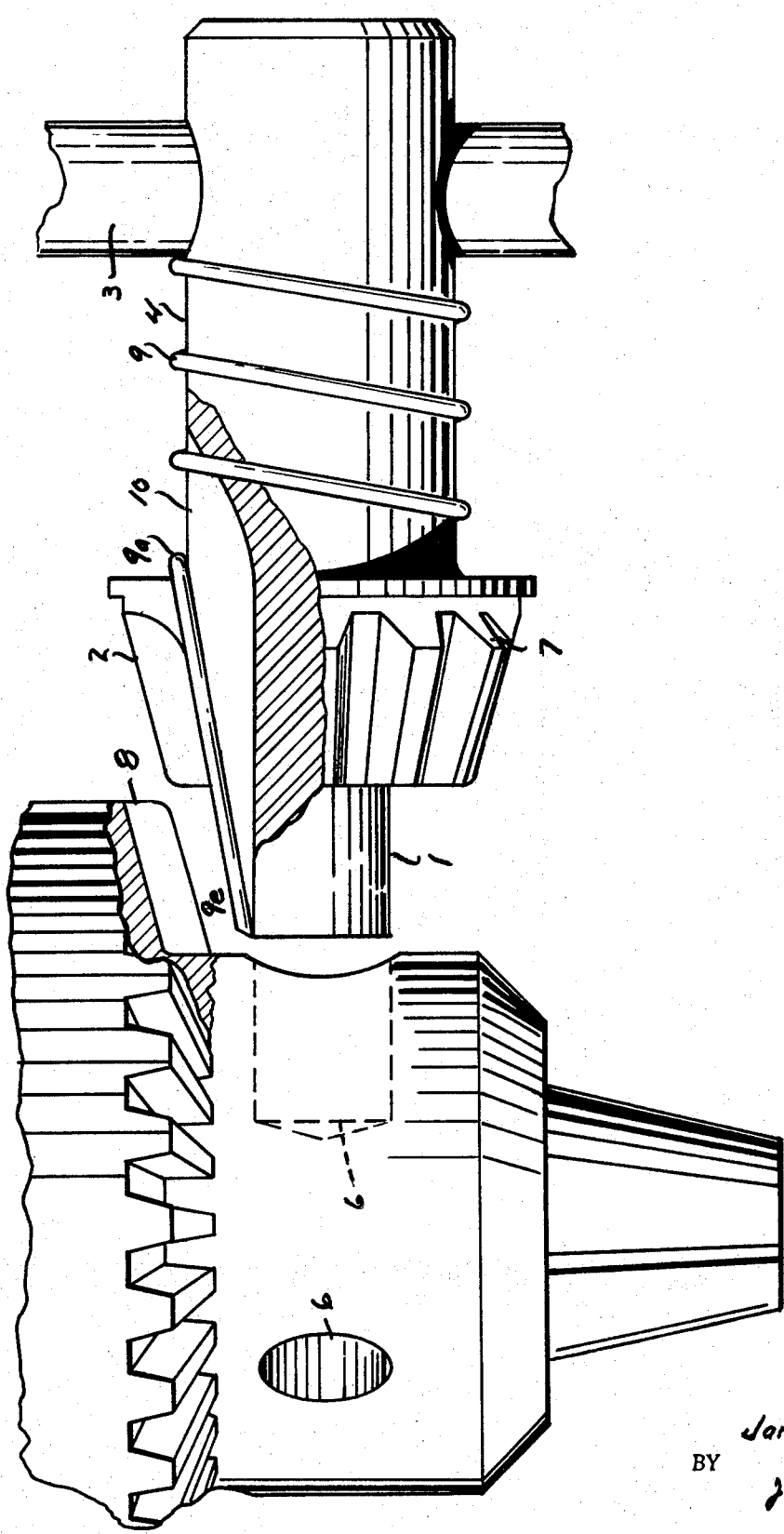

SELF-EJECTING CHUCK KEY

BACKGROUND OF THE INVENTION

This invention relates to insertable-removable gear type wrenches commonly called "chuck keys" which are used to open or close the jaws of chucks that are used in both stationary and portable machine tools, particularly in the use of power driven manes involving high speed drill spindles where operator injury can result when such wrenches are not removed from the chuck before the motor is started.

Power driven chucks, particularly chucks for holding small diameter drills are frequently rotated at high speeds. In order to remove and later to re-install drills it is necessary to adjust the jaw clearance of the chuck by inserting a chuck key into the keyhole in the side of the chuck body. It is obvious that such adjustment must be made when the chuck is not rotating. However, the use of a conventional chuck key is hazardous to personnel, particularly to inexperienced operators. For instance, if after the drill is installed removal of the chuck key is forgotten it is likely to be whirled out at high velocity when the drill spindle motor is again turned on.

Heretofore, in order to minimize this hazard, others have devised relatively complicated self-ejecting chuck keys which consist of at least three components, involving a telescoping cylinder-plunger assembly and an internally contained spring, or have attempted to prevent negligent use of the key by attaching a self-retracting keyholder on the lower part of the drill spindle housing.

SUMMARY OF THE INVENTION

The present invention is directed to providing a chuck key which offers greater safety to operators of power driven equipment having a chuck requiring manual adjustment of jaw clearance, or degree of tightness. The chuck key of this invention is self-ejecting and of equal importance, can be manufactured with only slight modification to present conventional pilot-pinion keys which are not self ejecting.

It will be appreciated that to provide a self-ejecting key to the power tool trade which will find ready acceptance a low cost of manufacture is at least as important as reliability and simplicity of construction.

The self-ejecting feature of the chuck key of this invention is provided, in its simplest form, by attaching spring means directly to the shank of the key in a manner such that a spring is sufficiently biased when the pilot is manually pressed into the hole in the chuck body as to eject the entire key when manual pressure is released.

In practicing this invention in its preferred embodiment a conventional chuck key consisting of a pilot, pinion gear and handle is modified by forming a slot or hole longitudinally of the pinion midway of the space between two teeth, thereby providing a direct passageway for the spring means which extends from the handle area to the pilot area of the key. In the drawings:

FIG. 1 is a view, partly cut away, of the self-ejecting chuck key of the invention and shows a fragment of a chuck.

Referring now to FIG. 1, the chuck key, includes a shaft 4, provided with a handle 3 at one end and with pinion 2 and pilot 1 at the other end. In use pilot 1 is inserted in one of the holes 6 in the chuck body whereby one or more of the pinion gear teeth 7 become engaged with one or more of the teeth 8 of the gear on chuck 5. Rotation of key shank 4, by means of handle 3, causes rotation of the bevel rack gear whereby the jaws can be adjusted to or from gripping position. A kerf or hole 10 is provided extending between two teeth of the pinion. If a kerf is used the bottom is flush with the periphery of the pilot 1.

Surrounding the shank 4 of the key is an open helical spring 9 having one end bearing against the handle 3. The other end of the spring is bent at 9a at an angle so that it extends downwardly into the kerf and beyond the pinion teeth and extends out of the kerf alongside the key pilot where it engages the pilot at the end. It will be noted that the end of 9e is preferably cut at an angle to prevent it from interfering with the insertion of the key pilot into the hole.

Self-ejection of the key after manual insertion of pilot 1 into chuck keyhole 6 is obtained as a reaction from the displacement of the spring extension 9e, which displacement starts as the pilot enters the hole 6 and the end of the extension 9e engages with the side of the chuck body. This results in the part 9e being moved to the right, thus compressing the turns 9 of the open helical spring which surrounds the shank 4 of the key handle. The extension 9e, when formed, was displaced radially toward the axis of the helical turns 9, thereby causing it to be adjacent or to engage with the pilot 1 when installed, thus preventing interference with the intermeshing of teeth 7 and 8. To provide clearance for the lateral displacement of 9e toward pilot 1 and to allow for its movement longitudinally toward the helical part of the spring when the pilot is inserted in keyhole 6, the slot 10 is made slightly wider than the diameter of the spring wire 9. The slot is positioned midway between two successful teeth 7 and extends from the juncture of the pilot 1 and pinion 2 to a point beyond the juncture of the pinion and shank 4. It will be seen that the bottom of slot 10 is of such depth at one end as to aligned with the periphery of the pilot. Beyond that point the slot bottom depth diminishes until the slot ends at a point between the pinion and handle which, as shown, is near the first turn of the helix 9. Slot 10 may be formed either by forging or can be produced as a kerf by sawing or milling.

It will be appreciated that the passageway for the part 9e of the spring could be formed by a drilling a slanting hole, sufficiently large to allow free movement of the part 9e from the base of the pilot pinion through the pinion.

What is claimed is:

1. A self-ejecting chuck key for a chuck having a body and a pilot hole, said key comprising a shank portion having a handle at one end and pilot and pinion portions on the other end and having improved ejection means comprising spring means secured to said key and extending toward the chuck body substantially as far as the end of the pilot portion and arranged to be displaced when the pilot portion enters the pilot hole by engagement with a side of the chuck, said spring means including an open resilient helical spring section disposed around and concentric with said shank portion and a portion extending at an angle from the helical portion alongside said pilot portion.

2. A chuck key as described in claim 1, wherein said key is formed with a passageway through said pinion portion for said extension of said spring means.

3. A chuck key as described in claim 2, wherein said extension is semi-rigid and is loosely disposed in said passageway and is so positioned adjacent said pilot portion as to engage the side of the chuck body when said pilot portion is manually forced into and held in pilot hole of the chuck, said engagement causing a compressive bias in said helical portion, said helical portion causing the semi-rigid portion of the spring to eject the chuck key when the pilot portion is no longer held in the hole.

4. A chuck key as described in claim 3, wherein said passageway is a kerf and has a portion parallel to the axis of the key and opens through the pinion portion at the surface of the pilot.

5. A chuck key as described in claim 4 wherein the parallel portion of the kerf is sufficiently long that said semi-rigid part of the spring may be moved lengthwise of the pilot portion at least as far as the pilot portion enters the pilot hole.

6. A chuck key as described in claim 5, wherein the angle of said extending portion is such as to cause said chuck engaging portion to extend in close contact with the end of the pilot portion.

* * * * *